(12) United States Patent
Murayama et al.

(10) Patent No.: US 6,183,659 B1
(45) Date of Patent: Feb. 6, 2001

(54) FERRITE OXIDE MAGNETIC MATERIAL (75) Inventors: Satoshi Murayama; Motoi Kumagai, both of Tokyo (JP)

(73) Assignee: TDK Corporation, Tokyo (JP)

( * ) Notice: Under 35 U.S.C. 154(b), the term of this patent shall be extended for 0 days.

(21) Appl. No.: 09/412,599

(22) Filed: Oct. 6, 1999

(30) Foreign Application Priority Data

Oct. 23, 1998 (JP) .................................................. 10-320027

(51) Int. Cl.$^7$ ....................................................... H01F 1/34
(52) U.S. Cl. .................. 252/62.62; 252/62.6; 252/62.64; 252/62.59; 336/233
(58) Field of Search ........................... 336/233; 252/62.6, 252/62.59, 62.62, 62.64

(56) References Cited

FOREIGN PATENT DOCUMENTS

| | | |
|---|---|---|
| 2-60110 | 2/1990 | (JP) . |
| 2-137301 | 5/1990 | (JP) . |
| 3-91209 | 4/1991 | (JP) . |
| 4-278502 | * 10/1992 | (JP) . |
| 8-51011 | 2/1996 | (JP) . |
| 8-51012 | 2/1996 | (JP) . |

* cited by examiner

Primary Examiner—C. Melissa Koslow
(74) Attorney, Agent, or Firm—Oblon, Spivak, McClelland, Maier & Neustadt, P.C.

(57) ABSTRACT

A ferrite oxide magnetic material containing, as basic composition, 11 to 19 mol % of iron oxide calculated in terms of $Fe_2O_3$, 11 to 25 mol % of zinc oxide calculated in terms of ZnO, 0 to 10 mol % of copper oxide calculated in terms of CuO, and a residual part of nickel oxide, and further containing, as components subsidiary to the basic composition, 0.01 to 15 wt % of lead oxide calculated in terms of PbO, and 0.01 to 15 wt % of silicon oxide and/or talc calculated in terms of $SiO_2$, wherein the ferrite oxide magnetic material has an initial magnetic permeability of not higher than 8, a sintered density of not lower than 4.8 g/cm$^3$ and a stress-resisting and magnetic-field-resisting characteristic in a range of ±5% calculated in terms of the rate ΔL/L of the change of inductance due to the condition of a magnetic field of 1000 G under a compressive stress P=5 (kg/mm$^2$) parallel with a direction of magnetization.

8 Claims, 7 Drawing Sheets

FERRITE OXIDE MAGNETIC MATERIAL

BACKGROUND OF THE INVENTION

The present invention relates to a ferrite oxide magnetic material used as a material for a core of an inductance device and particularly relates to a ferrite oxide magnetic material used as a material for a core of a resin-molded type chip inductor.

To meet the needs of small size, light weight, high accuracy, and so on, in the field of resin-molded type chip inductors, fixed coils, and so on, for which demands have become increased rapidly in recent years in the field of television sets, video recorders, mobile communication machines, and so on, there has been an increased demand for narrow tolerance and high reliability on these parts. To meet the demand, a ferrite core material used as a material for magnetic cores of these parts is required to have the following characteristic.

(1) The material has a low initial magnetic permeability ($\mu i$) for fine adjustment of inductance due to winding. Particularly in the case of a vertically-placed type ferrite core, the initial magnetic permeability needs to be low ($\mu i$: not higher than 8) so that the fine adjustment can be made by a half turn.

(2) The material has a high sintered density.

(3) The material has a characteristic in which the change of inductance is small against external stress due to a molded resin. The ratio of the change of inductance against external stress, that is, the ratio of the change of inductance against a load applied to a rod-like sample so as to be parallel with a direction of magnetization is hereinafter referred to as stress-resisting characteristic. That is, the material has an excellent stress-resisting characteristic.

(4) The material has a characteristic in which the change of inductance is small against both external stress due to a molded resin and external magnetic field applied to the material. The ratio of the change of inductance against both external stress and external magnetic field, that is, the ratio of the change of inductance against a load applied to a rod-like sample in parallel with a direction of magnetization and an external magnetic field which are applied and released is hereinafter referred to as stress-resisting and magnetic-field-resisting characteristic. That is, the material has excellent stress-resisting and magnetic-field-resisting characteristic.

When a molded inductor device was assembled, the device might be exposed to a magnetic field of high magnetic flux density. Accordingly, particularly in the stress-resisting and magnetic-field-resisting characteristic, there was an important question whether initial characteristic could be kept or not when the device was actually put into a final product even in the case where the device per se was adjusted to have a predetermined value of inductance. Further, even after the device was actually put into a final product, the chip inductor per se was not shielded magnetically. Accordingly, it was also necessary to avoid the bad influence of magnetization generated in electromagnetic parts around the chip inductor.

As an attempt to meet the aforementioned demand, there is known an attempt to improve stress-resisting characteristic by use of ferrite containing basic composition described in JP-A-2-60110 and JP-A-2-137301. However, sufficiently high sintered density to be practically satisfactory cannot be achieved when a core material having a low initial magnetic permeability $\mu i$ of not higher than 8 is to be obtained by use of the ferrite material containing such basic composition. Reduction of sintered density causes a problem in lowering of stress-resisting characteristic, penetration of a resin or an adhesive agent into pores of a ferrite core, and so on. Accordingly, sintered density cannot be reduced. On the contrary, when sintered density is to be increased, the initial magnetic permeability is increased to be not smaller than 8. In any case, a core material having practically satisfactory characteristic can be hardly obtained.

JP-A-8-51011 and JP-A-8-51012 disclose: an oxide magnetic material containing from 0 to 10 wt % of $SiO_2$ (exclusive of 0 wt %), and from 0 to 10 wt % of $Bi_2O_3$ (exclusive of 0 wt %) in addition to main components consisting of from 5 to 24 mol % of $Fe_2O_3$, from 0 to 30 mol % of CuO (exclusive of 0 mol %), and a residual part of NiO; an oxide magnetic material containing from 0 to 0.5 wt % of $Co_3O_4$ (exclusive of 0 wt %) in addition to the main components; an oxide magnetic material containing from 5 to 24 mol % of $Fe_2O_3$, from 0 to 30 mol % of ZnO (exclusive of 0 mol %), from 0 to 30 mol % of CuO (exclusive of 0 mol %), and a residual part of NiO; and an oxide magnetic material containing from 0 to 0.5 wt % of $Co_3O_4$ (exclusive of 0 wt %), from 0 to 10 wt % of $SiO_2$ (exclusive of 0 wt %), and from 0 to 10 wt % of $Bi_2O_3$ (exclusive of 0 wt %) in addition to the main components in order to reduce both the change of inductance due to external stress and the lowering of inductance after application of an external magnetic field.

However, the composition discussed by way of examples in JP-A-8-51011 and JP-A-8-51012 is $Fe_2O_3$: 5, 10, 20 and 24.5 mol %; and ZnO: 7 and 30 mol % (other constituent elements are omitted). That is, no composition but this composition is not discussed in JP-A-8-51011 and JP-A-8-51012. Further, the stress-resisting and magnetic-field-resisting characteristic of a core obtained in the range of this composition is insufficient. Accordingly, to meet the demand for both high accuracy and high reliability, greater improvement of performance as to total characteristic including initial magnetic permeability, sintered density, magnetic field-resisting characteristic, stress-resisting characteristic, stress-resisting and magnetic-field-resisting characteristic, etc. has been required.

For example, a background-art ferrite core material containing the aforementioned basic composition, that is, containing, as basic composition:

$Fe_2O_3$: 48 mol %;
NiO: 49 mol %; and
CuO: 3 mol %;
and containing as subsidiary components in addition to the basic composition:
Pbo: 6 wt %; and
talc: 6.5 wt %;
exhibits the following characteristic: a sintered density of 4.6 g/cm³; an initial magnetic permeability $\mu i$ of 6.0; and stress-resisting characteristic ΔL/L(%) of −9% (at 1 ton/cm²). If an initial magnetic permeability $\mu i$ of about 6 is to be obtained in such a background-art ferrite core, not only the sintered density becomes low to be 4.6 g/cm³ but also the stress-resisting characteristic becomes large to be −9% (at 1 ton/cm²).

Figure 8:
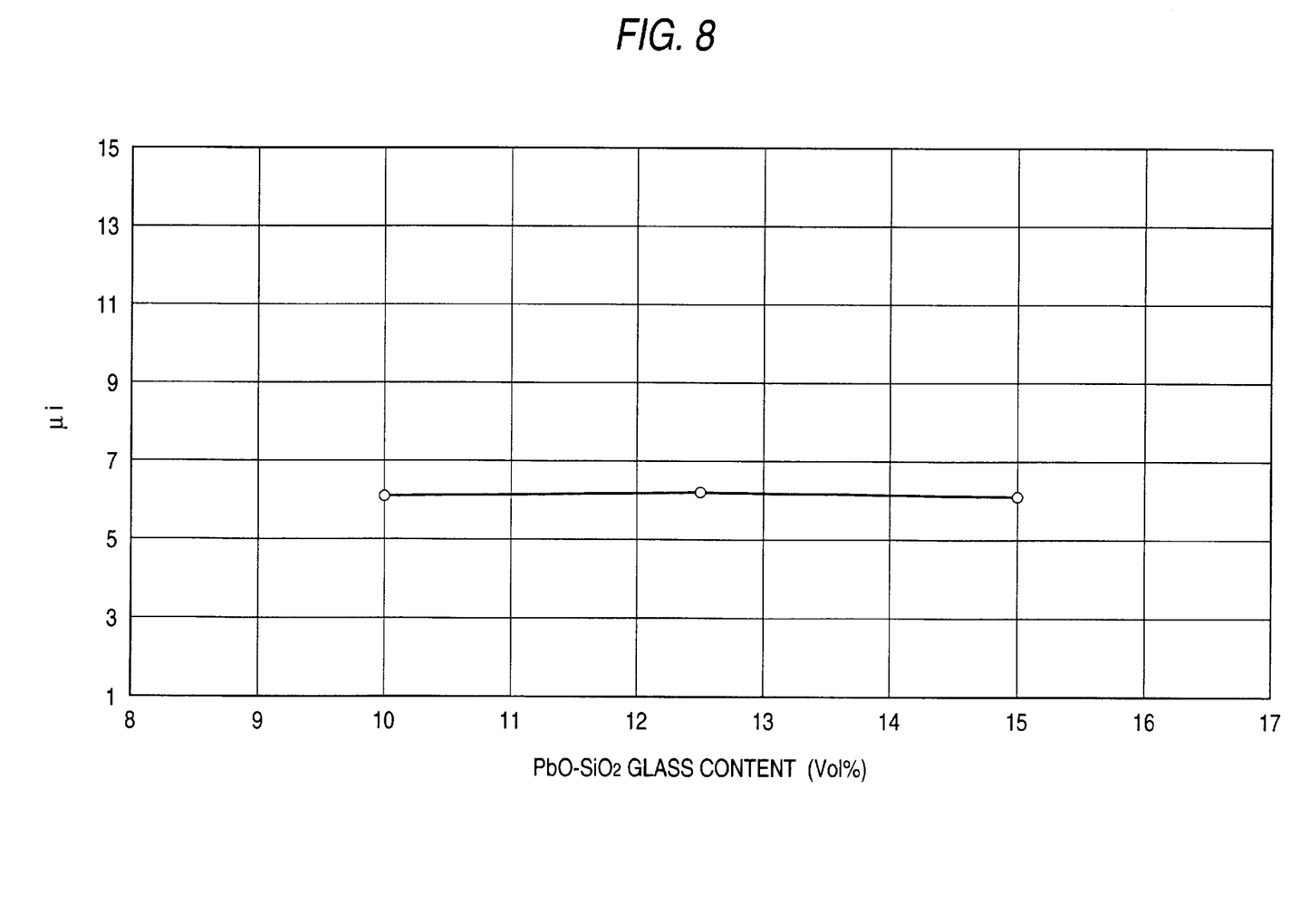
FIG. 8 is a graph showing the relation between initial magnetic permeability $\mu i$ and the amount of PbO—$SiO_2$ glass when the amount of PbO—$SiO_2$ glass in a background-art ferrite material having a general composition is changed.

Further, FIG. 8 shows the relation between the amount of PbO—$SiO_2$ glass and the initial magnetic permeability $\mu i$ in the case where the amount of PbO—$SiO_2$ glass in the ferrite having the aforementioned composition is changed. It is apparent from FIG. 8 that the initial magnetic permeability of the ferrite having the composition is little reduced even in the case where the amount of PbO—$SiO_2$ glass is increased.

Furthermore, JP-A-3-91209 discloses a chip inductor characterized in that a drum type core formed from a ferrite composition which is a spinel type composition containing 25 to 45 mol % of Fe2O3, 0 to 20 mol % of ZnO and residual part of NiO and CuO with the molarity of NiO being larger than the molarity of CuO and further containing 0.1 to 12 wt % of Bi2O3, and 0.05 to 4.0 wt % of $SiO_2$ as trace components is wound with a coil and molded with an epoxy resin. In JP-A-3-91209, there is a further description that inductance is reduced when a stress is applied to the chip inductor by the epoxy resin and an external magnetic field is applied to this chip inductor.

SUMMARY OF THE INVENTION

An object of the present invention is to provide a ferrite core having a low initial magnetic permeability, a high sintered density, excellent magnetic field-resisting characteristic, excellent stress-resisting characteristic and excellent stress-resisting and magnetic-field-resisting characteristic so that a resin-molded type inductor or fixed coil with both narrow tolerance and high reliability can be achieved.

According to the present invention, the foregoing object is achieved by the following configuration.

A ferrite oxide magnetic material containing, as basic composition: 11 to 19 mol % of iron oxide calculated in terms of $Fe_2O_3$; 11 to 25 mol % of zinc oxide calculated in terms of ZnO; 0 to 10 mol % of copper oxide calculated in terms of CuO; and a residual part of nickel oxide;

the ferrite oxide magnetic material further containing, as components subsidiary to the basic composition: 0.01 to 15 wt % of lead oxide calculated in terms of PbO; and 0.01 to 15 wt % of silicon oxide and/or talc calculated in terms of $SiO_2$;

the ferrite oxide magnetic material having an initial magnetic permeability of not higher than 8, a sintered density of not lower than 4.8 g/cm$^3$ and a stress-resisting and magnetic-field-resisting characteristic in a range of ±5% calculated in terms of the rate ΔL/L of the change of inductance due to the condition of a magnetic field of 1000 G under a compressive stress P=5 (kg/mm$^2$) parallel with a direction of magnetization.

Preferably, a ferrite oxide magnetic material further has a magnetic field-resisting characteristic in a range from −4% to 0% calculated in terms of the rate ΔL/L of the change of inductance due to the condition of a magnetic field of 1000 G.

More preferably, a ferrite oxide magnetic material further has a stress-resisting and magnetic-field-resisting characteristic in a range of ±3% calculated in terms of the rate ΔL/L of the change of inductance due to the condition of a magnetic field of 1000 G under a compressive stress P=5 (kg/mm$^2$) parallel with the direction of magnetization.

Further, a ferrite oxide magnetic material containing, as the basic composition: 14 to 19 mol % of iron oxide calculated in terms of $Fe_2O_3$; 14 to 22 mol % of zinc oxide calculated in terms of ZnO; 0 to 6 mol % of copper oxide calculated in terms of CuO; and a residual part of nickel oxide.

Furthermore, according to the present invention, it is provided a resin-molded chip inductor having a core made from a ferrite oxide magnetic material as mentioned above.

However, since the chip inductor disclosed in the JP-A-3-91209 contains 25 to 45 mol % of $Fe_2O_3$, the composition range is clearly different from the composition range of iron oxide of from 11 to 19 mol % calculated in terms of $Fe_2O_3$ according to the present invention. Further, the oxide magnetic material according to the present invention has a low magnetic permeability and a high density to prevent lowering of strength and has stress-resisting characteristic and magnetic field-resisting characteristic. In addition, the oxide magnetic material according to the present invention has an effect of preventing penetration of resin. Such characteristic is absent in the chip inductor described in JP-A-3-91209 and is peculiar to the present invention.

DETAILED DESCRIPTION OF THE DRAWINGS

DETAILED DESCRIPTION OF THE PREFERRED EMBODIMENTS

There is provided a ferrite oxide magnetic material according to the present invention containing, as basic composition:

11 to 19 mol % of iron oxide calculated in terms of $Fe_2O_3$;

11 to 25 mol % of zinc oxide calculated in terms of ZnO;

0 to 10 mol % of copper oxide calculated in terms of CuO; and a residual part of nickel oxide;

the ferrite oxide magnetic material further containing, as components subsidiary to the basic composition:

0.01 to 15 wt % of lead oxide calculated in terms of PbO; and 0.01 to 15 wt % of silicon oxide and/or talc calculated in terms of $SiO_2$;

the ferrite oxide magnetic material having an initial magnetic permeability of not higher than 8, a sintered density of not lower than 4.8 g/cm$^3$ and a stress-resisting and magnetic-field-resisting characteristic in a range of ±5% calculated in terms of the rate ΔL/L of the change of inductance due to the condition of a magnetic field of 1000 G under a compressive stress P=5 (kg/mm$^2$) parallel with a direction of magnetization. By the aforementioned basic composition, the iron oxide magnetic phase is reduced and the initial magnetic permeability $\mu i$ is reduced critically compared with ferrite having a composition near a stoichiometrical composition.

The iron oxide content in the basic composition is from 11 to 19 mol %, preferably from 14 to 19 mol %, especially from 16 to 19 mol % calculated in terms of $Fe_2O_3$. If the iron oxide content is larger than 19 mol %, the stress-resisting and magnetic-field-resisting characteristic is worsened because the density is too high to reduce the initial magnetic permeability. In the case where the iron oxide content is not larger than 19 mol %, the iron oxide has to be contained even by a small content. Preferably, the lower limit of the iron oxide content is that shown in the aforementioned range. If the iron oxide content is reduced, the function of the magnetic material is lowered because the magnetic component in the ferrite core is reduced.

Examples of a divalent metal to be substituted for iron oxide include nickel oxide, zinc oxide, copper oxide, magnesium oxide, and so on. Particularly, zinc oxide and nickel oxide are used in the present invention. The amount of zinc oxide is from 11 to 25 mol %, preferably from 14 to 22 mol %, especially from 16 to 20 mol % calculated in terms of ZnO. Nickel oxide is used as the residual part. When the amount of zinc oxide to be added is selected to be in the aforementioned range, very excellent stress-resisting and magnetic-field-resisting characteristic is obtained. In addition to these metals, copper oxide may be added in an amount of from 0 to 10 mol %, preferably from 0 to 6 mol %, calculated in terms of CuO. Although copper oxide is used for controlling the baking temperature, CuOx is generated to cause variations in characteristic if the amount of copper oxide to be added is too large.

The ferrite oxide magnetic material according to the present invention contains as subsidiary components in addition to the aforementioned basic composition:

0.01 to 15 wt % of lead oxide calculated in terms of PbO; and 0.01 to 15 wt % of silicon oxide and/or talc calculated in terms of $SiO_2$.

Preferably, the ferrite oxide magnetic material according to the present invention contains as subsidiary components:

0.1 to 10 wt % of lead oxide calculated in terms of PbO; and 0.1 to 10 wt % of silicon oxide and/or talc calculated in terms of $SiO_2$.

By addition of these subsidiary components, stress-resisting characteristic is improved so that the baking temperature range of from about 1100 to about 1300° C. adapted for the aforementioned basic composition can be reduced to a range of from about 950 to about 1050° C., particularly from about 970 to about 1030° C. by a value of from about 100 to about 300° C. Accordingly, a good sintered density is preferably obtained at a lower temperature. If the amount of the subsidiary components to be added is too small, the effect of a sintering assistant is hardly obtained. If the amount of the subsidiary components to be added is larger than 30 wt %, there arises a problem in contamination of furnace materials and sintering tools such as precipitation of glass on a core surface, deposition of cores onto each other, deposition of a core to a setter, and so on.

The ferrite oxide magnetic material according to the present invention has an initial magnetic permeability $\mu i$ of not higher than 8 and has a sintered density of not lower than 4.8 $g/cm^3$. The initial magnetic permeability is preferably not higher than 7, especially not higher than 6. The lower limit of the initial magnetic permeability is about 2 though it is not limited specifically. The sintered density is preferably not lower than $g/cm^3$, especially not lower than 5.2 $g/cm^3$. The upper limit of the sintered density is about 6 $g/cm^3$ though it is not limited specifically. If the initial magnetic permeability is higher than 8, it is difficult to microadjust inductance by winding. If the sintered density is lower than 4.8 $g/cm^3$, stress-resisting characteristic is lowered so that there arises such a problem that variations occur in characteristic, a resin or adhesive agent soaks into pores of a core, etc., when the ferrite oxide magnetic material is used as an inductor.

Further, the ferrite oxide magnetic material according to the present invention has a stress-resisting and magnetic-field-resisting characteristic in a range of ±5% preferably in a range of ±3%, especially in a range of ±2% calculated in terms of the ratio $\Delta L/L$ of the change of inductance due to the condition of application of a DC magnetic field of 1000 G perpendicular to a direction of application of stress under a compressive stress P=5 ($kg/mm^2$) parallel with a direction of magnetization. Further, the ferrite oxide magnetic material according to the present invention has a magnetic field-resisting characteristic preferably in a range of from −4% to 0% calculated in terms of the ratio $\Delta L/L$ of the change of inductance at the time of application of a DC magnetic field -resisting of 1000 G. When the magnetic-field characteristic is in the aforementioned range, the ferrite oxide magnetic material preferably hardly receives a bad influence of the external magnetic field on electromagnetic characteristic. Incidentally, the aforementioned DC magnetic field means magnetic field intensity (measured) applied near by a sample at the time of measurement of inductance.

The ferrite oxide magnetic material according to the present invention is molded into a predetermined-shape core material. After the core material is wound with a necessary winding coil, the core material is resin-molded. Thus, the core material is used as a fixed inductor, a chip inductor, or the like, in various kinds of electronic appliances such as television sets, video recorders, mobile communication appliances, e.g. portable telephones, car telephones, etc., and so on. Although the shape of the core is not limited specifically, examples of the core include a drum type core, a toroidal core, an I-shaped core, etc. having an external diameter of not larger than 2 mm and having a length of not larger than 2 mm (for example, 1.8 mm diameter×1.3 mm length).

A resin used as a molding material (coating material) is not limited specifically. Examples of the resin include a thermoplastic resin, a thermocurable resin, and so on. Specific examples of the resin include a polyolefin resin, a polyester resin, a polyamide resin, a polycarbonate resin, a polyurethane resin, a phenol resin, an urea resin, an epoxy resin, etc. Examples of the means for molding the molding material include dipping, coating, spraying, etc., and further include injection molding, cast molding, etc.

A typical example of configuration of a chip inductor using the ferrite oxide magnetic material according to the present invention will be described below with reference to the drawings.

Figure 3:
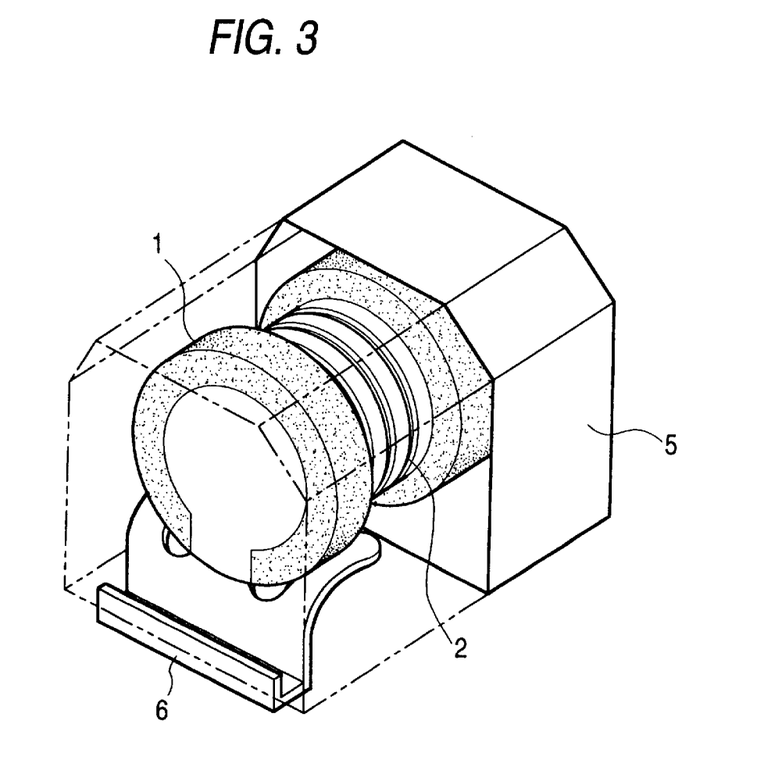
FIG. 3 is a schematic configuration view showing an example of configuration of a chip inductor using the ferrite oxide magnetic material according to the present invention.

FIG. 3 is a schematic configuration view showing an example of configuration of a chip inductor using the ferrite oxide magnetic material according to the present invention. In the configuration example shown in FIG. 3, the chip inductor has: a core 1 using the ferrite oxide magnetic material according to the present invention and having large-diameter jaw portions at its opposite ends; a coil 2 wound on a trunk portion of the core 1; a piece of contactinitiated metal foil 6 for connecting an external electric circuit to opposite end portions of the coil 2 and fixing the core 1 into a resin; and a molding material 5 provided so as to cover the outside of those parts.

The configuration of the chip inductor is not limited to the example shown in the drawings but various modes can be taken. For example, the chip inductor may be configured so that lead wires are connected axially from a center portion of a cylindrical shaft of the core or the chip inductor may be configured so that a coil naked material formed by provision of a coil, lead wires, etc. on the core is inserted in a box-like resin casing and then an opening portion of the resin casing is sealed with a molding material.

A method of producing the ferrite oxide magnetic material according to the present invention will be described below.

First, a mixture of raw materials for basic composition and raw materials for subsidiary components, if necessary, are prepared. The raw materials for basic composition are iron oxide ($\alpha$-$Fe_2O_3$) and the aforementioned additive metal oxides or metals forming the aforementioned oxides by sintering, preferably, the aforementioned metal oxides. The respective raw materials are mixed so that the final composition of ferrite has the aforementioned proportion.

Then, the raw materials for the basic composition are mixed with the raw materials for subsidiary components, if necessary, and baked preliminary. The preliminary baking is performed preferably in an oxidizing atmosphere, generally in the air. The preliminary baking temperature is preferably from 800 to 1000° C. The preliminary baking time is preferably from 1 to 3 hours.

The preliminary baked material is pulverized into a predetermined size by a ball mill, or the like.

After the preliminary baked material is pulverized, a proper amount of a proper binder such as polyvinyl alcohol, or the like, is added thereto and the resulting mixture is molded into a predetermined shape.

Then, the molded body is baked. The baking is performed preferably in an oxidizing atmosphere, generally in the air. The baking temperature is preferably from 1100 to 1300° C. When the aforementioned subsidiary components are added, the baking temperature is preferably from about 950 to about 1050° C. The baking time is preferably from 2 to 5 hours.

EXAMPLES

Examples of the present invention will be described below more specifically.

Example 1

$Fe_2O_3$ powder, NiO powder, CuO powder, PbO powder and $SiO_2$ powder were prepared as raw materials. The raw material powders were mixed so that the final composition had the following composition. The mixture was preliminary baked at 900° C. for 3 hours and pulverized into preliminary baked ferrite powder. After a binder was added to the ferrite powder, the ferrite powder was pressure-molded into a doughnut-like toroidal core having an outer diameter of about 21 mm, an inner diameter of about 12 mm and a height of about 5 mm. The toroidal core was baked at a temperature of from 950 to 1200° C. for 2 hours to thereby obtain a core sample of a ferrite oxide magnetic material. After baking, the core sample had an outer diameter of about 18 mm, an inner diameter of about 10 mm and a height of about 4.3 mm.

$Fe_2O_3$: from 12 to 24 mol %
CuO: 1 mol %
NiO: residual part

Additive components (under the condition that the total amount of the components of the basic composition was 100 wt %)

PbO: 5.0 wt %
$SiO_2$: 3.1 wt %

Figure 1:
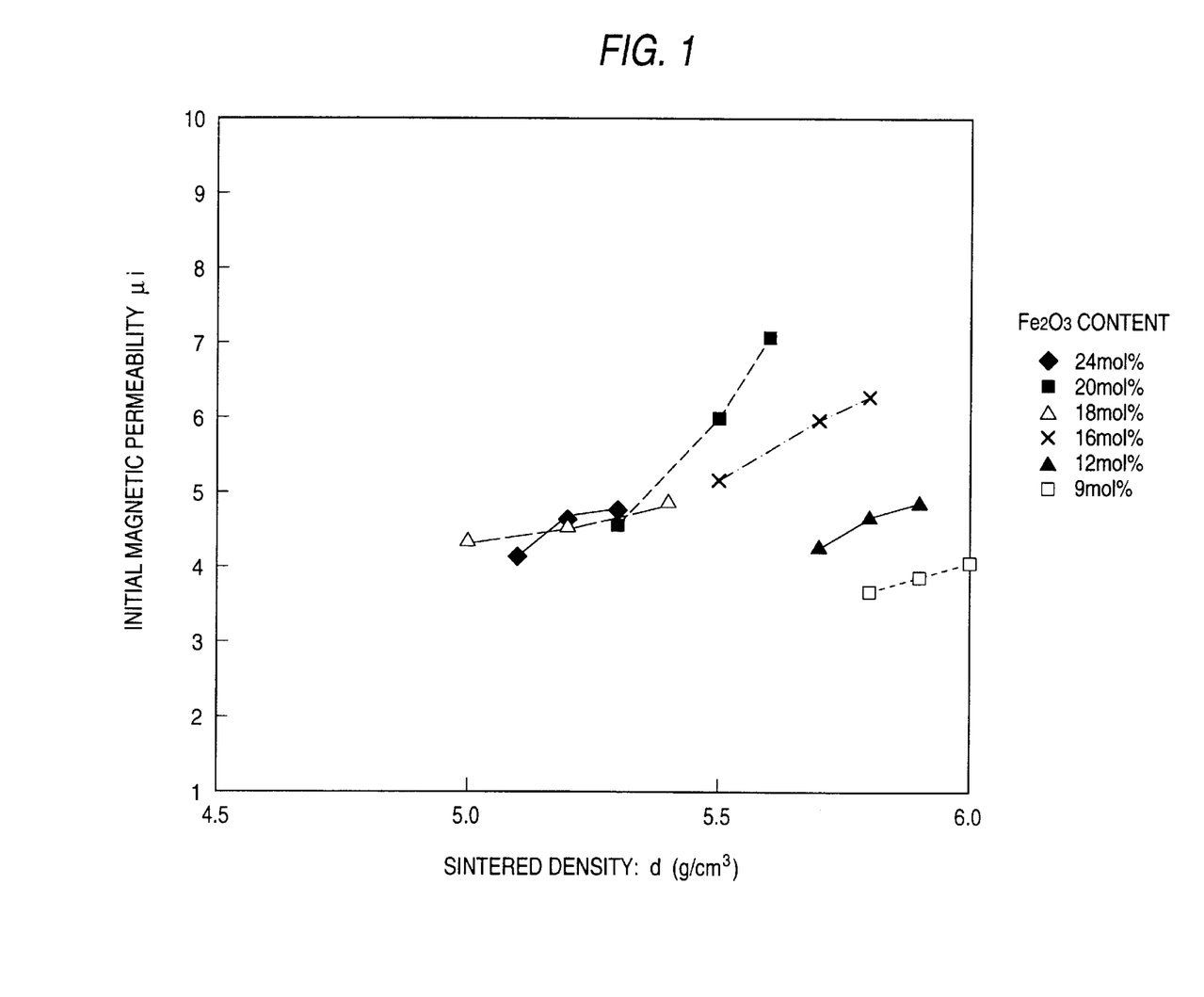
FIG. 1 is a graph showing the relation between initial magnetic permeability $\mu i$ and sintered density d in connection with the amount of $Fe_2O_3$.

Both initial magnetic permeability $\mu i$ and sintered density d of the toroidal core sample thus obtained were measured. FIG. 1 shows the relation between the initial magnetic permeability $\mu i$ and the sintered density when the amount of $Fe_2O_3$ in the core sample is changed in a range of from 12 to 24 mol %. It is apparent from FIG. 1 that the sintered density of the core sample containing 12 to 24 mol % of $Fe_2O_3$ increases as the $Fe_2O_3$ content decreases, that is, a core sample having a lower initial magnetic permeability can be obtained as the $Fe_2O_3$ content decreases. It is supposed this is because the magnetic phase decreases and the non-magnetic phase increases as the $Fe_2O_3$ content decreases. It is further apparent that the core sample containing 12 to 24 mol % of $Fe_2O_3$ exhibits a low initial magnetic permeability $\mu i$ with a high density. Further, since the dependency of the initial magnetic permeability $\mu i$ on the change of the sintered density is reduced, variations in mass-produced articles can be reduced.

Example 2

$Fe_2O_3$ powder, NiO powder, ZnO powder, PbO powder and $SiO_2$ powder were prepared as raw materials. The raw material powders were mixed so that the final composition had the following composition. The mixture was preliminary baked at 900° C. for 3 hours and pulverized into ferrite powder. After a binder was added to the ferrite powder, the ferrite powder was pressure-molded into a predetermined-shape toroidal core. The toroidal core was baked at a temperature of from 950 to 1200° C. for 2 hours so that a core sample of a ferrite oxide magnetic material was obtained.

$Fe_2O_3$: 18 mol %
ZnO: 18 mol %
NiO: 64 mol %

Additive components (under the condition that the total amount of components of the basic composition was 100 wt %)

PbO: 5.0 wt %
$SiO_2$: 3.1 wt %

Both initial magnetic permeability $\mu i$, sintered density d and relative temperature factor $\alpha \mu i r$ of the sample thus obtained were measured in the same manner as in Embodiment 1. An I-shaped core about 10 mm long by about 10 mm wide by about 50 mm high was molded and baked and the stress-resisting characteristic thereof was measured. As a result, excellent characteristic was obtained as follows: initial magnetic permeability $\mu i$=4.5; sintered density d=5.1 (g/cm$^3$); $\alpha \mu i r$=1 (ppm/°C.); and stress-resisting characteristic $\Delta L/L$=1% (at 1 ton/cm$^2$).

Figure 2:
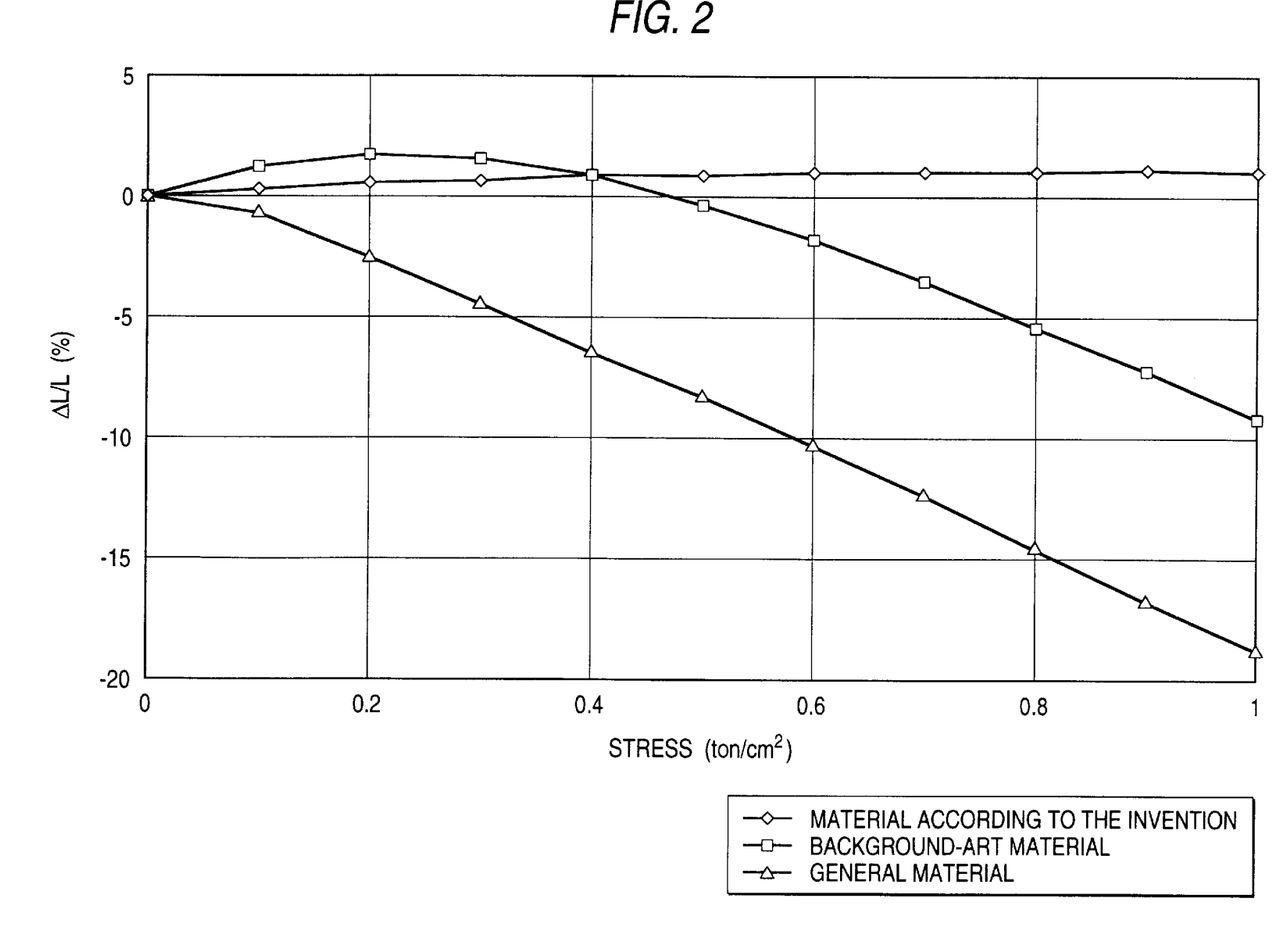
FIG. 2 is a graph showing measurement of stress-resisting characteristic against load of from 0 to 1 ton/cm$^2$ in a core material according to the present invention, a background-art core material and a general core material.

Further, stress-resisting characteristic against a load of from 0 to 1 (ton/cm$^2$) was measured by use of the material according to the present invention, the background-art material shown in FIG. 8 (and containing as basic composition:

$Fe_2O_3$: 48 mol %;
NiO: 49 mol %; and
CuO: 3 mol %;

and containing as subsidiary components in addition to the basic composition:

PbO: 6 wt %; and
talc: 6.5 wt %)

and a general material which was a background-art material described in JP-A-2-60110 and JP-A-2-137301 (and containing as basic composition:

$Fe_2O_3$: 49 mol %;
NiO: 43 mol %; and
CuO: 6 mol %;

and containing no subsidiary component). FIG. 2 shows the results.

It is apparent from FIG. 2 that the ferrite oxide magnetic material according to the present invention exhibits such an excellent characteristic that the ratio of the change of stress-resisting characteristic against the change of load is low compared with the general material and the background-art material.

Example 3

A drum type core having a height of about 1.3 mm and having a core trunk portion with a diameter of about 1.0 mm and opposite-side flange portions with a diameter of about 1.8 mm was produced by use of the same material as that used in the sample obtained in Embodiment 2. Aresin-molded type chip inductor shown in FIG. 3 was produced from each of the drum type core together with a drum type core having the same shape produced by use of the aforementioned background-art material. The ratio of the change of inductance L in each chip inductor after resin-molding was evaluated. Results were shown as follows.

|  | L or simple coil ($\mu$H) | L after resin-molded ($\mu$H) | Ratio of change of L (%) |
|---|---|---|---|
| Background-art material | 0.930 | 0.910 | −2.2 |
| Material according to the invention | 0.625 | 0.632 | 1.1 |

It is apparent from the aforementioned results that the ratio of the change of inductance L due to resin-molding stress in the chip inductor according to the present invention is lower than that in the chip inductor produced from the background-art material.

Example 4

$Fe_2O_3$ powder, NiO powder, ZnO powder, PbO powder and $SiO_2$ powder were prepared as raw materials. The raw material powders were mixed so that the final composition had the following proportion. The mixture was preliminary baked at 900° C. for 3 hours and pulverized into ferrite powder. After a binder was added to the ferrite powder, the ferrite powder was pressure-molded into a predetermined-shape drum core. The drum core was baked at a temperature of from 950 to 1200° C. for 2 hours to thereby obtain a core sample of a ferrite oxide magnetic material.

$Fe_2O_3$: 18 mol %
ZnO: from 18 to 24 mol %
NiO: residual part
Additive components (under the condition that the total amount of components of the basic composition was 100 wt %)
PbO: 5.0 wt %
$SiO_2$: 3.1 wt %

Figure 4:
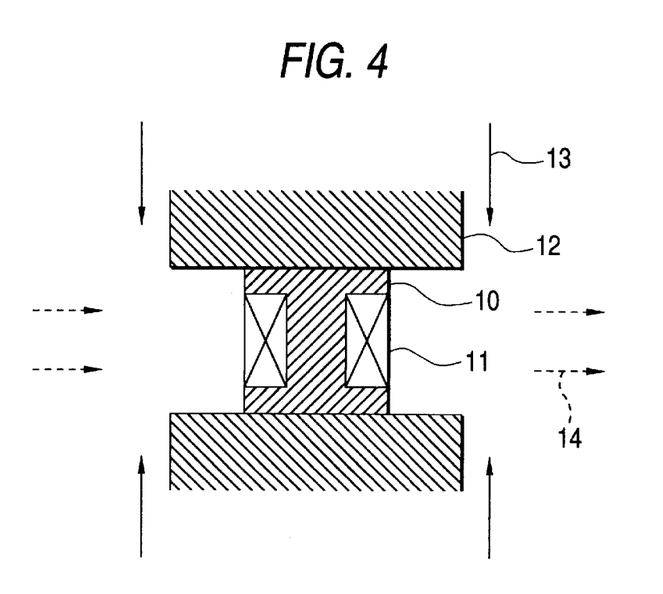
FIG. 4 is a conceptual view showing a configuration for measuring stress-resisting and magnetic-field-resisting characteristic.
Figure 5:
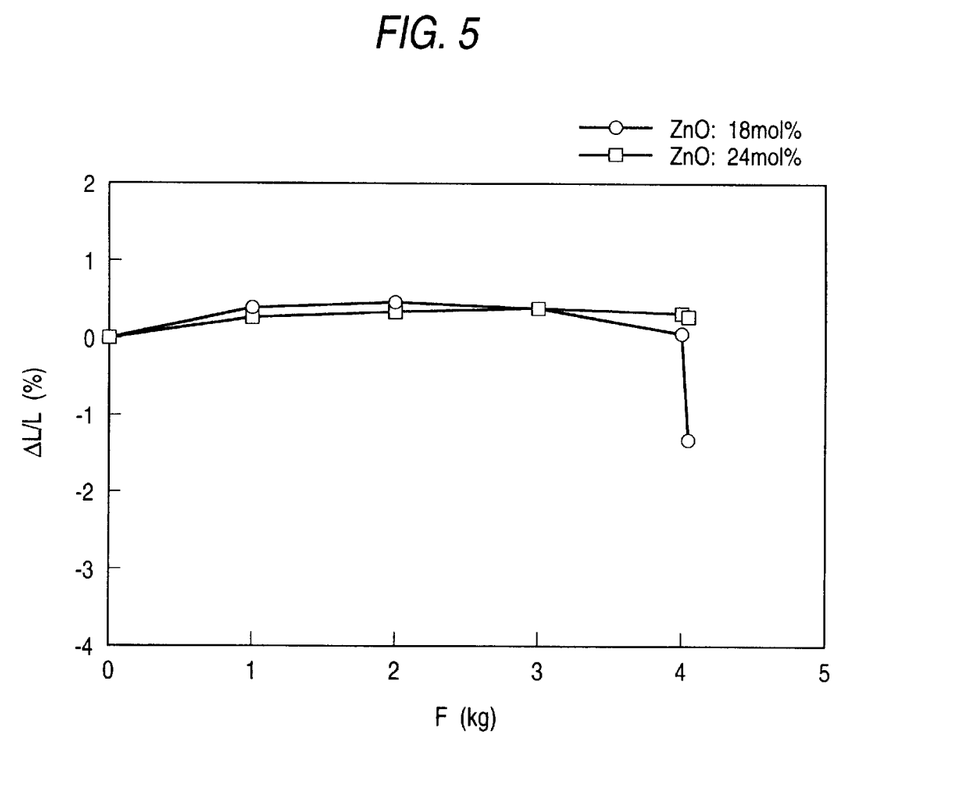
FIG. 5 is a graph showing the stress-resisting and magnetic-field-resisting characteristic of a sample when the zinc oxide content of the sample is changed.

The sample thus obtained was wound with a predetermined winding wire. That is, as shown in FIG. 4, a core sample 10 having a height of about 1.3 mm and having a core trunk portion with a diameter of about 1.0 mm and opposite-side flange portions with a diameter of about 1.8 mm was wound with a coil 11. While a compressive stress 13 of from 0 to 4 kg was applied to the sample by a pressurizer 12 in a direction parallel with a line of magnetic force generated by the coil 11, stress-resisting characteristic ΔL/L was measured. Further, an external magnetic field of 1000 G expressed as the line of magnetic force 14 perpendicular to the direction of application of stress at the time of application of 4 kg stress was applied to the sample for 30 seconds and then released. The ratio ΔL/L of the change of inductance in this case was measured as stress-resisting and magnetic-field-resisting characteristic. FIG. 5 shows the results. Incidentally, in FIG. 5, pressure P ($kg/mm^2$) corresponding to the applied force F (kg) is calculated on the basis of the sectional area of the core as follows: P=1.3 for F=1; P=2.6 for F=2; P=3.9 for F=3; P=5.2 for F=4; and P=6.4 for F=5.

Example 5

$Fe_2O_3$ powder, NiO powder, ZnO powder, PbO powder and $SiO_2$ powder were prepared as raw materials. The raw material powders were mixed so that the final composition had the following proportion. The mixture was preliminary baked at 900° C. for 3 hours and pulverized into ferrite powder. After a binder was added to the ferrite powder, the ferrite powder was pressure-molded into a drum core having a height of about 1.3 mm and having a core trunk portion with a diameter of about 1.0 mm and opposite-side flange portions with a diameter of about 1.8 mm. The drum core was baked at a temperature of from 950 to 1200° C. for 2 hours to thereby obtain a core sample of a ferrite oxide magnetic material.

Sample 1
$Fe_2O_3$: 7 mol %
ZnO: 18 mol %
NiO: 75 mol %
Additive components (under the condition that the total amount of components of the basic composition was 100 wt %)
PbO: 5.0 wt %
$SiO_2$: 3.1 wt %

Sample 2
$Fe_2O_3$: 18 mol %
ZnO: 15 mol %
NiO: 67 mol %
Additive components (under the condition that the total amount of components of the basic composition was 100 wt %)
PbO: 5.0 wt %
$SiO_2$: 3.1 wt %

Sample 3
$Fe_2O_3$: 18 mol %
ZnO: 18 mol %
NiO: 64 mol %
Additive components (under the condition that the total amount of components of the basic composition was 100 wt %)
PbO: 5.0 wt %
$SiO_2$: 3.1 wt %

Comparative Sample
$Fe_2O_3$: 10 mol %
ZnO: 7.5 mol %

NiO: 82.5 mol %

Additive components (under the condition that the total amount of components of the basic composition was 100 wt %)

PbO: 0.5 wt %

$SiO_2$: 0.5 wt %

Figure 6:
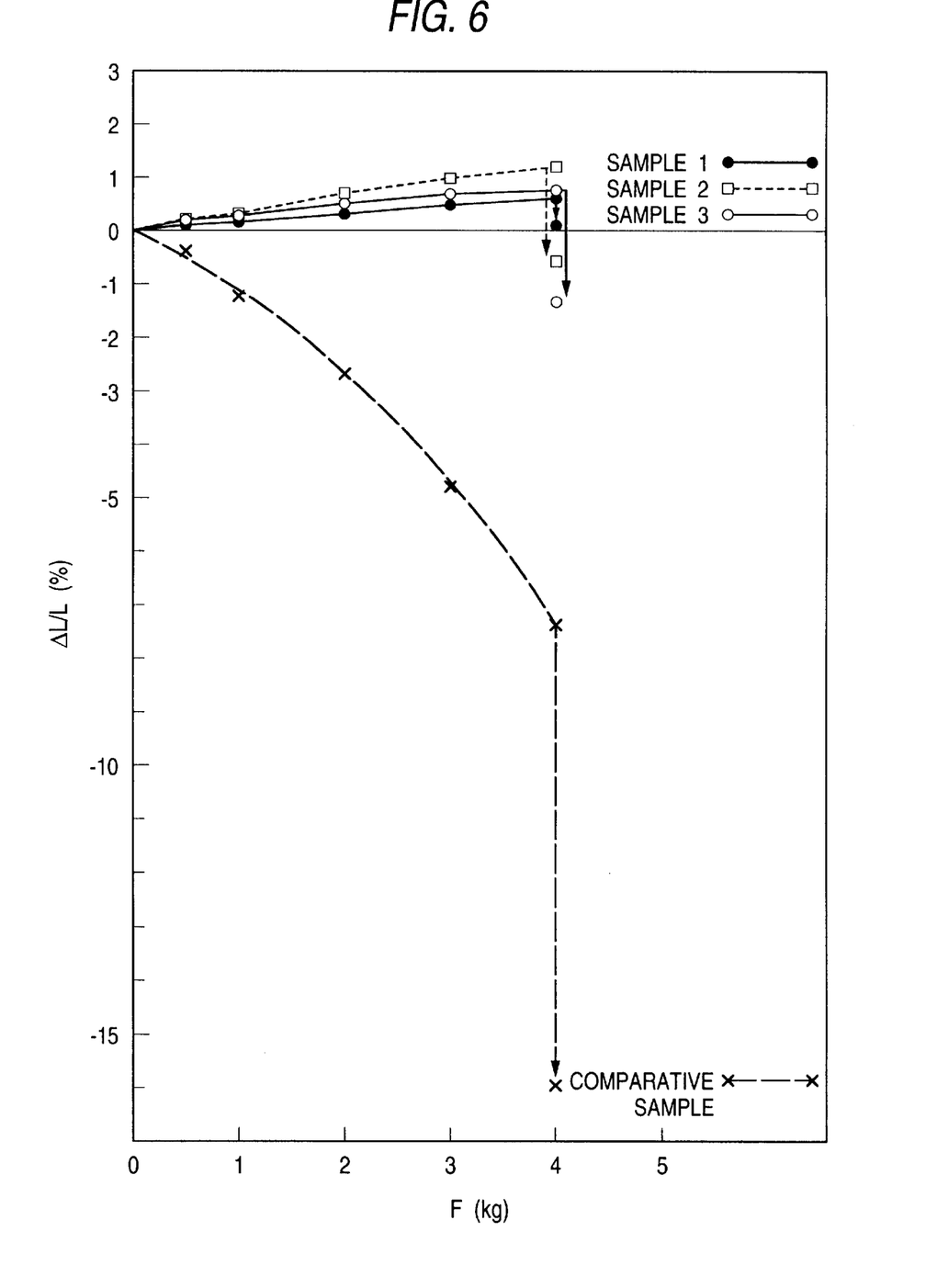
FIG. 6 is a graph showing the stress-resisting and magnetic-field-resisting characteristic in each of a comparative sample and samples according to the present invention.

Both stress-resisting characteristic and stress-resisting and magnetic-field-resisting characteristic of each of the samples thus obtained were measured in the same manner as in Embodiment 4. FIG. 6 shows the results. Incidentally, in FIG. 6, pressure P ($kg/mm^2$) corresponding to the applied force F (kg) is calculated on the basis of the sectional area of the core as follows: P=1.3 for F=1; P=2.6 for F=2; P=3.9 for F=3; P=5.2 for F=4; and P=6.4 for F=5.

It is apparent from FIG. 6 that Samples 1 to 3 according to the present invention exhibit very excellent values of stress-resisting and magnetic-field-resisting characteristic $\Delta L/L$ in a range of ±2%. On the other hand, the stress-resisting and magnetic-field-resisting characteristic $\Delta L/L$ of the comparative sample was not larger than −15%.

Example 6

$Fe_2O_3$ powder, NiO powder, ZnO powder, PbO powder and $SiO_2$ powder were prepared as raw materials. The raw material powders were mixed so that the final composition had the following proportion. The mixture was preliminary baked at 900° C. for 3 hours and pulverized into ferrite powder. After a binder was added to the ferrite powder, the ferrite powder was pressure-molded into a predetermined-shape drum core. The drum core was baked at a temperature of from 950 to 1200° C. for 2 hours to thereby obtain a core sample of a ferrite oxide magnetic material.

$Fe_2O_3$: 18 mol %

ZnO: from 12 to 18 mol %

NiO: residual part

Additive components (under the condition that the total amount of components of the basic composition was 100 wt %)

PbO: 5.0 wt %

$SiO_2$: 3.1 wt %

Figure 7:
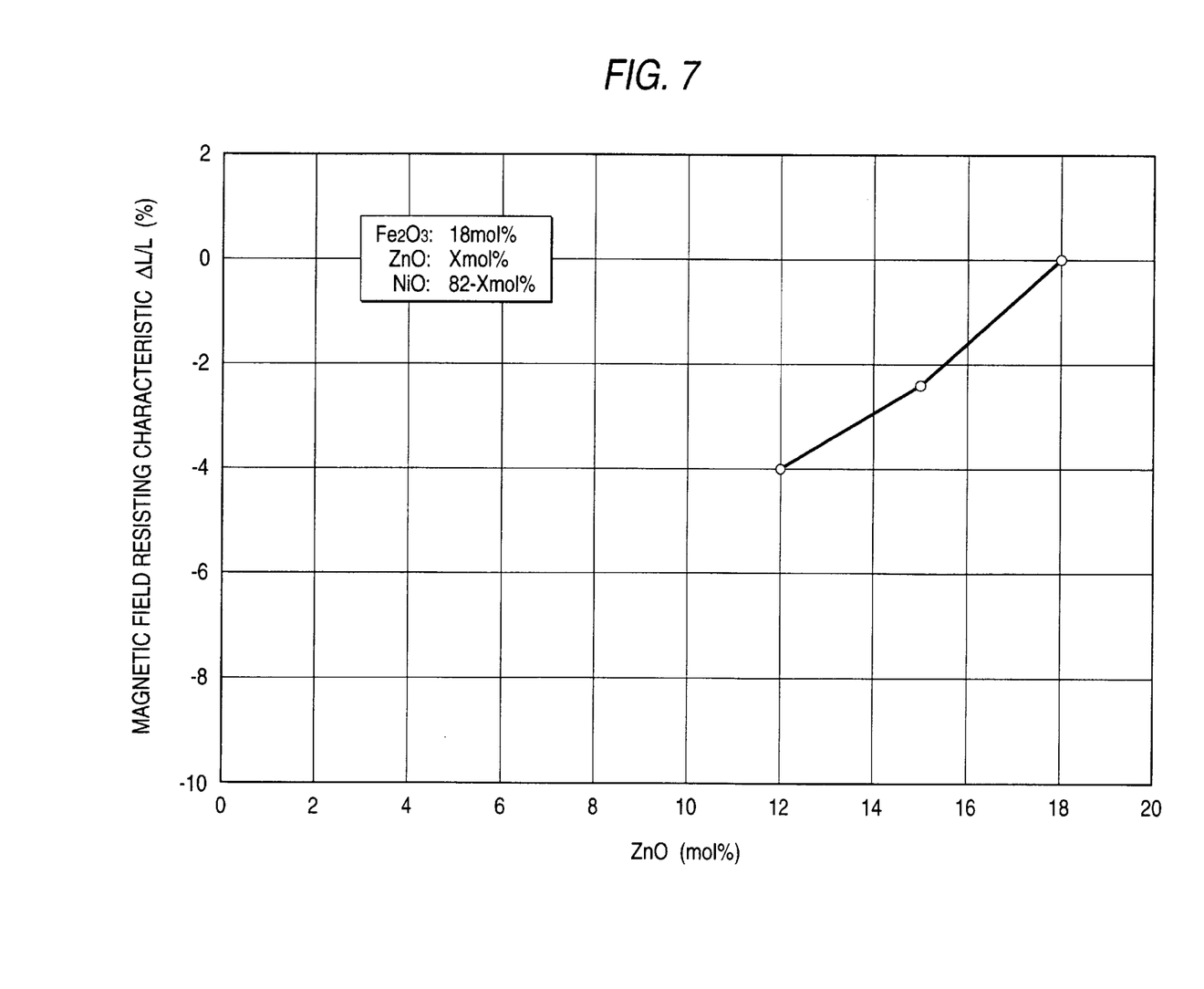
FIG. 7 is a graph showing the relation between the amount of zinc oxide to be added and magnetic field-resisting characteristic.

The magnetic field-resisting characteristic of the sample thus obtained was measured as the ratio $\Delta L/L$ of the change of inductance when a magnetic field of 1000 G was applied to the sample. FIG. 7 shows the results.

It is apparent from FIG. 7 that the core sample containing 12 to 18 mol % of ZnO exhibits excellent values of magnetic field-resisting characteristic in a range of from 0 to −5%.

Comparative Example 1

The initial magnetic permeability $\mu i$, the sintered density d and the relative temperature factor $\alpha \mu ir$ of a sample having the same composition as that of the comparative sample used in Embodiment 5 were measured in the same manner as in Embodiment 1. Further, the stress-resisting characteristic of the sample was measured in the aforementioned manner. As a result, the sample exhibited initial magnetic permeability $\mu i$=5, sintered density d=4.9 ($g/cm^3$), $\alpha \mu ir$=10 (ppm/°C.) and stress-resisting characteristic $\Delta L/L$=−5% (at 1 ton/$cm^2$). Accordingly, the sample was inferior to the sample according to the present invention.

Further, the magnetic field-resisting characteristic of the obtained sample was measured in the same manner as in Embodiment 6. As a result, the magnetic field-resisting characteristic was −7%. Accordingly, the sample was inferior to the sample according to the present invention.

As described above, according to the present invention, there can be provided a ferrite core having a low initial magnetic permeability, a high sintered density, excellent magnetic field-resisting characteristic, stress-resisting characteristic and stress-resisting and magnetic-field-resisting characteristic so that a rein-molded type inductor or fixed coil with both narrow tolerance and high reliability can be achieved.

What is claimed is:

1. A ferrite oxide magnetic material containing basic composition and subsidiary components, said basic composition essentially consisting of:

11 to 19 mol % of iron oxide calculated in terms of $Fe_2O_3$;

11 to 25 mol % of zinc oxide calculated in terms of ZnO;

0 to 10 mol % of copper oxide calculated in terms of CuO; and a residual part of nickel oxide;

said subsidiary components including:

0.01 to 15 wt % of lead oxide calculated in terms of PbO; and 0.01 to 15 wt % of at least one of silicon oxide and talc calculated in terms of $SiO_2$;

wherein said ferrite oxide magnetic material having an initial magnetic permeability of not higher than 8, a sintered density of not lower than 4.8 $g/cm^3$ and a stress-resisting and magnetic-field-resisting characteristic in a range of ±5% calculated in terms of the rate $\Delta L/L$ of the change of inductance due to the condition of a magnetic field of 1000 G under a compressive stress P=5 ($kg/mm^2$) parallel with a direction of magnetization.

2. A ferrite oxide magnetic material according to claim 1, further having a magnetic field-resisting characteristic in a range from −4% to 0% calculated in terms of the rate $\Delta L/L$ of the change of inductance due to the condition of a magnetic field of 1000 G.

3. A ferrite oxide magnetic material according to claim 1, further having a stress-resisting and magnetic-field-resisting characteristic in a range of ±3% calculated in terms of the rate $\Delta L/L$ of the change of inductance due to the condition of a magnetic field of 1000 G under a compressive stress P=5 (kg/mm2) parallel with said direction of magnetization.

4. A ferrite oxide magnetic material according to claim 1, wherein said basic composition essentially consists of:

14 to 19 mol % of iron oxide calculated in terms of $Fe_2O_3$;

14 to 22 mol % of zinc oxide calculated in terms of ZnO;

0 to 6 mol % of copper oxide calculated in terms of CuO; and a residual part of nickel oxide.

5. A resin-molded chip inductor comprising:

a core made from a ferrite oxide magnetic material containing basic composition and subsidiary components, said basic composition essentially consisting of:

11 to 19 mol % of iron oxide calculated in terms of $Fe_2O_3$;

11 to 25 mol % of zinc oxide calculated in terms of ZnO;

0 to 10 mol % of copper oxide calculated in terms of CuO; and a residual part of nickel oxide;

said subsidiary components including:

0.01 to 15 wt % of lead oxide calculated in terms of PbO; and 0.01 to 15 wt % of at least one of silicon oxide and talc calculated in terms of $SiO_2$;

wherein said ferrite oxide magnetic material having an initial magnetic permeability of not higher than 8, a sintered density of not lower than 4.8 g/cm³ and a stress-resisting and magnetic-field-resisting characteristic in a range of ±5% calculated in terms of the rate ΔL/L of the change of inductance due to the condition of a magnetic field of 1000 G under a compressive stress P=5 (kg/mm²) parallel with a direction of magnetization.

6. A resin-molded chip inductor as claimed in claim 5, wherein said ferrite oxide magnetic material further has a magnetic field-resisting characteristic in a range from –4% to 0% calculated in terms of the rate ΔL/L of the change of inductance due to the condition of a magnetic field of 1000 G.

7. A resin-molded chip inductor as claimed in claim 5, wherein said ferrite oxide magnetic material further has a stress-resisting and magnetic-field-resisting characteristic in a range of ±3% calculated in terms of the rate ΔL/L of the change of inductance due to the condition of a magnetic field of 1000 G under a compressive stress P=5 (kg/mm2) parallel with said direction of magnetization.

8. A resin-molded chip inductor as claimed in claim 5, wherein said basic composition essentially consists of:

14 to 19 mol % of iron oxide calculated in terms of $Fe_2O_3$;

14 to 22 mol % of zinc oxide calculated in terms of ZnO;

0 to 6 mol % of copper oxide calculated in terms of CuO; and a residual part of nickel oxide.

* * * * *